United States Patent [19]
Solomon

[11] 3,800,500
[45] Apr. 2, 1974

[54] PACKAGING APPARATUS
[75] Inventor: William H. Solomon, Grand Rapids, Mich.
[73] Assignee: Oliver Machinery Company, Grand Rapids, Mich.
[22] Filed: May 30, 1972
[21] Appl. No.: 258,009

[52] U.S. Cl............... 53/180, 53/167, 53/372, 156/515
[51] Int. Cl.......... B65b 9/06, B65b 51/26
[58] Field of Search ......... 53/180, 182, 184, 372, 53/373, 167; 156/251, 267, 515; 219/10.53

[56] References Cited
UNITED STATES PATENTS
| | | | |
|---|---|---|---|
| 3,562,053 | 2/1971 | Lindley | 156/515 X |
| 3,660,205 | 5/1972 | Taylor | 156/515 |
| 3,650,089 | 3/1972 | Miller et al. | 53/180 |
| 3,449,889 | 6/1969 | Molitor | 53/182 |

FOREIGN PATENTS OR APPLICATIONS
657,280   9/1951   Great Britain .............. 53/182

Primary Examiner—Robert L. Spruill
Attorney, Agent, or Firm—Price, Heneveld, Huizenga & Cooper

[57] ABSTRACT

An improved packaging apparatus and method in which individual contoured articles are wrapped in a heat shrinkable film and the film is then cut and sealed along the contour of each article prior to being shrunk tightly about each article in a separate heat shrink tunnel. At least one profiling sealing means is reciprocated at a predetermined rate transverse to the flow of the film and articles contained therein. In one embodiment, one profiling sealing means seals one edge of the film about the article along a contour. In other embodiments, two profiling sealing means seal both edges of the film along either mirror image contours or two dissimilar contours.

15 Claims, 10 Drawing Figures

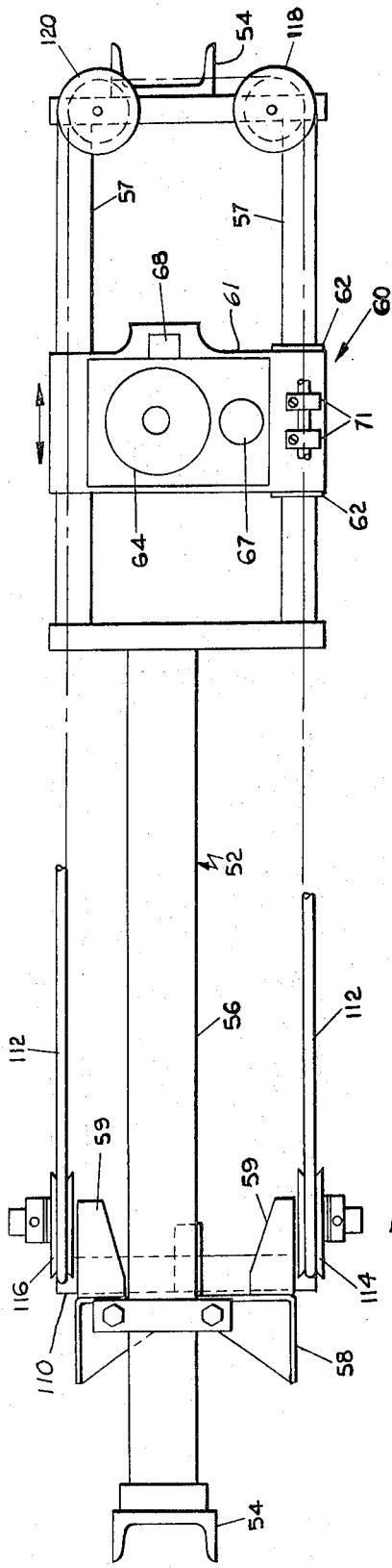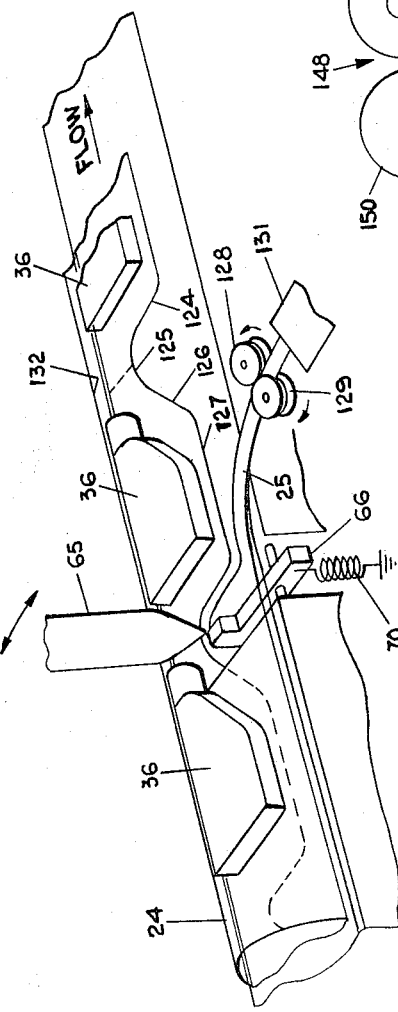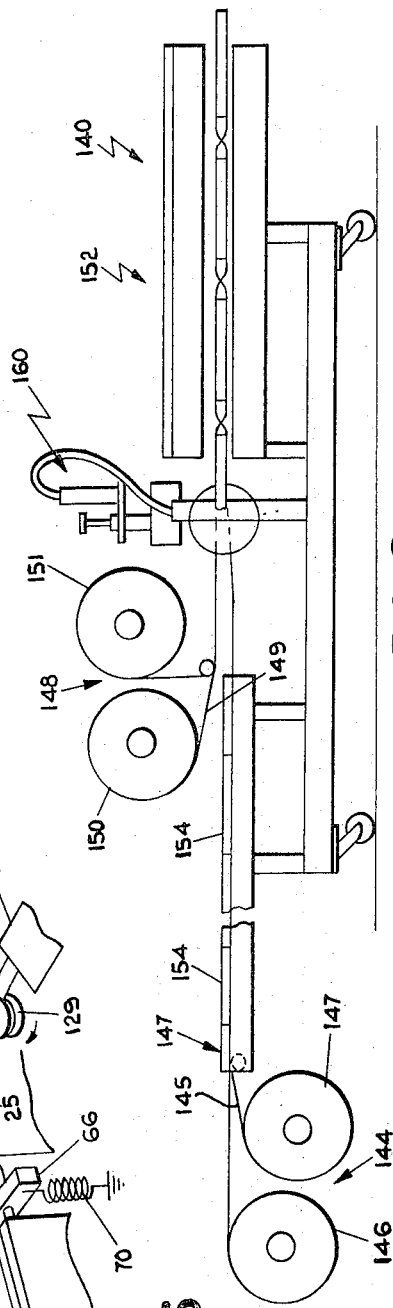

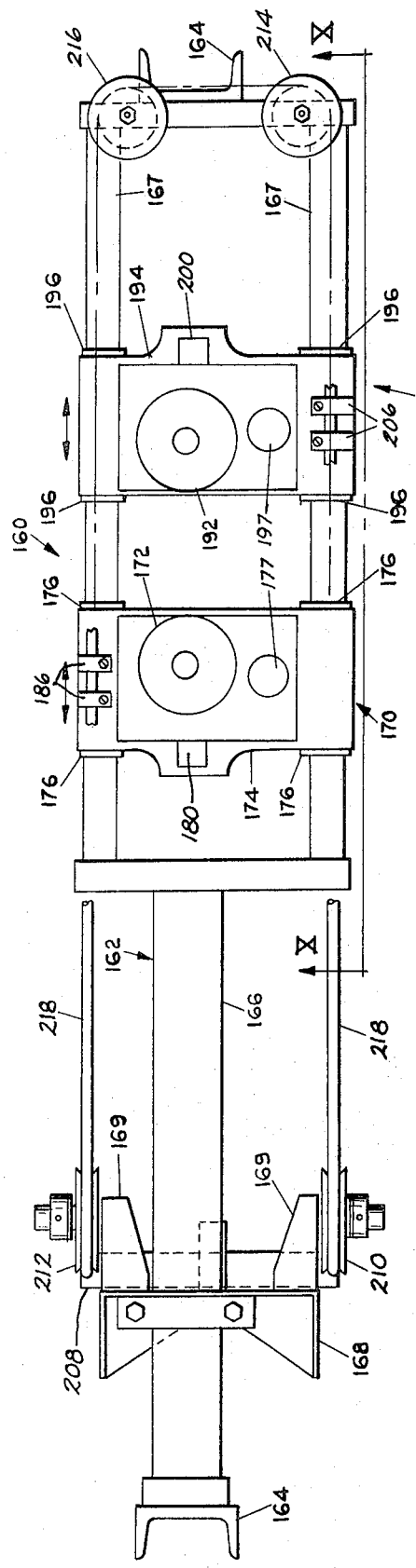
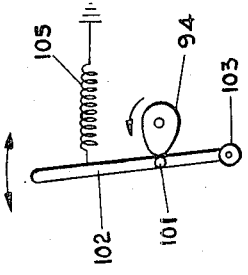
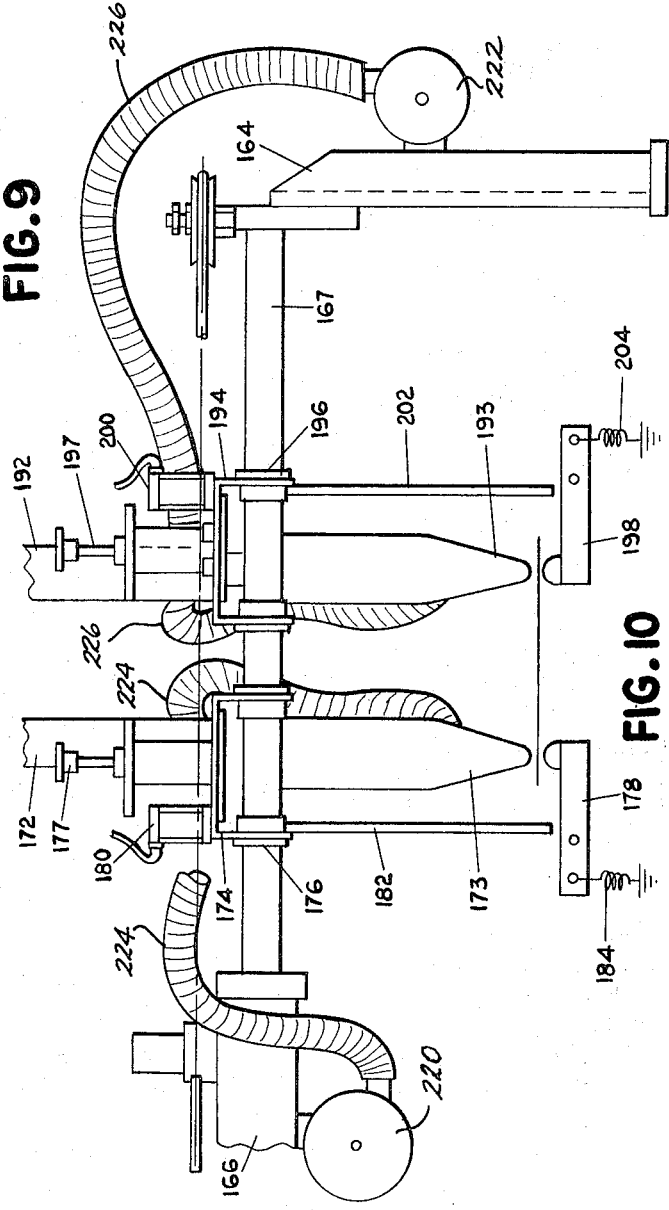

PACKAGING APPARATUS

This invention relates to a packaging apparatus and a method in which individual articles or product containers are wrapped in or covered by a heat shrinkable film prior to the shrinking of the film about the product container, and, more particularly, to a packaging invention wherein the heat shrinkable film is cut and sealed along the particular contours of the individual articles or product containers.

BACKGROUND OF THE INVENTION

Packaging apparatus for wrapping or covering individual articles or product containers in a heat shrinkable film, prior to the shrinking of that film about the containers in a heat shrink tunnel, are well known in the packaging field. Prior packaging machines or apparatus of this type have included various means for sealing the heat shrinkable film in a rectilinear fashion along the edges of the containers. The machines using this method and apparatus perform well when the individual containers are square, rectangular, or include straight sections which may be easily accommodated by the sealing means which seals in a straight line. However, when individual product containers have variously curved contours, such as sun tan lotion containers and the like having offset openings, are packaged with such machines, the rectilinear sealing means leaves large portions of shrinkable film between the contour of the bottle and the sealing lines. Specifically, when the containers are subsequently passed through the heat shrink tunnel, it has been found that large portions of the film left between the contour of the container and the sealed lines do not shrink sufficiently, thereby causing the film to fit sloppily around the contoured portions of the container. Consequently, the contoured containers packaged with the prior machine are unsightly in their packaged condition, and are detrimental to the display and commercial success of the product since the containers are aesthetically unappealing to the purchasing public.

SUMMARY OF THE INVENTION

Accordingly, it is an object and feature of the present invention to provide a packaging apparatus for wrapping or covering contoured articles or product containers with a heat shrinkable film, and cutting and sealing the film along at least one contour of each of the individual articles or product containers.

It is another object and feature of the present invention to provide a packaging apparatus which can accommodate and package in a profiled condition articles or product containers having various contours, and variously sized containers having each type of contour.

It is a further object and feature of the present invention to provide a packaging apparatus which is simply designed and constructed and, yet, which is efficient and durable in operation.

It is yet another object and feature of the present invention to provide a method for wrapping contoured articles or product containers with a heat shrinkable film, and cutting and sealing the film along at least one contour of each of the individual articles or product containers.

It is still another object and feature of the present invention to provide a packaging method which can accommodate and package in a profiled condition articles or product containers having various contours, and variously sized containers having each type of contour.

The packaging apparatus herein is for packaging contoured articles by specially wrapping or covering and sealing those articles with a heat shrinkable film prior to shrinking the film about said articles in a heat shrink tunnel. The apparatus includes an article infeed means, a heat shrinkable film supply means, and a drive means for advancing the film in a continuous flow through the apparatus and also for cutting and sealing the film between the articles after the film has been cut and sealed uniquely along the contour of the articles.

In one embodiment, the packaging apparatus also includes a film folder means for forming a film package from a single film web in which the individual articles to be packaged are inserted prior to being cut and sealed by a profiling sealing means for sealing the film along the contour of the articles. This profiling sealing means includes an adjustable, reciprocally-mounted, ultra-sonic sealing mens which is also vertically adjustably mounted on a base means. The base means in turn is slidably mounted over the flow of film and is reciprocated at a predetermined rate such that the sealing means follows a predetermined path on the film determined as by a camming means. The camming means may include a cammed pivot means having a removable contoured cam positively engaged therewith and a pulley and cable means, all of which is driven by motive power means. The shape of the path or contour followed by the ultra-sonic sealing means is determined by the shape of the contoured cam, and the magnitude of the particular contour determined by the cam is set by means of an adjustable connecting arm which connects the cammed pivot means with the pulley and cable means.

In other embodiments, two profiling sealing means are used simultaneously to seal a film package formed with two separate film webs along both longitudinal edges of the film. If symmetrical articles are to be packaged, both sealing means are reciprocated in mirror image contours by a single camming means. However, for asymmetrical articles, the sealing means are separately mounted and reciprocated along the dissimilar contours of the asymmetrical articles by separate camming means.

These and other objects, advantages and features of the invention will become apparent from a study of the following description taken in conjunction with the drawings.

BRIEF DESCRIPTION OF THE DRAWINGS

FIG. 4 is a plan view of the profiling sealing means shown in FIG. 2;

FIG. 5 is a fragmentary perspective view of the single ultra-sonic means cutting and sealing the heat shrinkable film along one edge contour of each individual contoured article;

FIG. 6 is a schematic drawing of one form of the contoured cam operably engaged with the cammed pivot means;

FIG. 7 is a schematic drawing of another form of the contoured cam operably engaged with the cammed pivot means;

FIG. 8 is a fragmentary side view of another embodiment of the packaging apparatus;

FIG. 9 is a plan view of this other embodiment of the packaging apparatus including two profiling sealing means; and FIG. 10 is a fragmentary, side elevation of the packaging apparatus shown in FIG. 9 taken along line X—X of FIG. 9.

DESCRIPTION OF THE PREFERRED EMBODIMENTS

Single Profiling Sealing Means Embodiment

Figure 1:
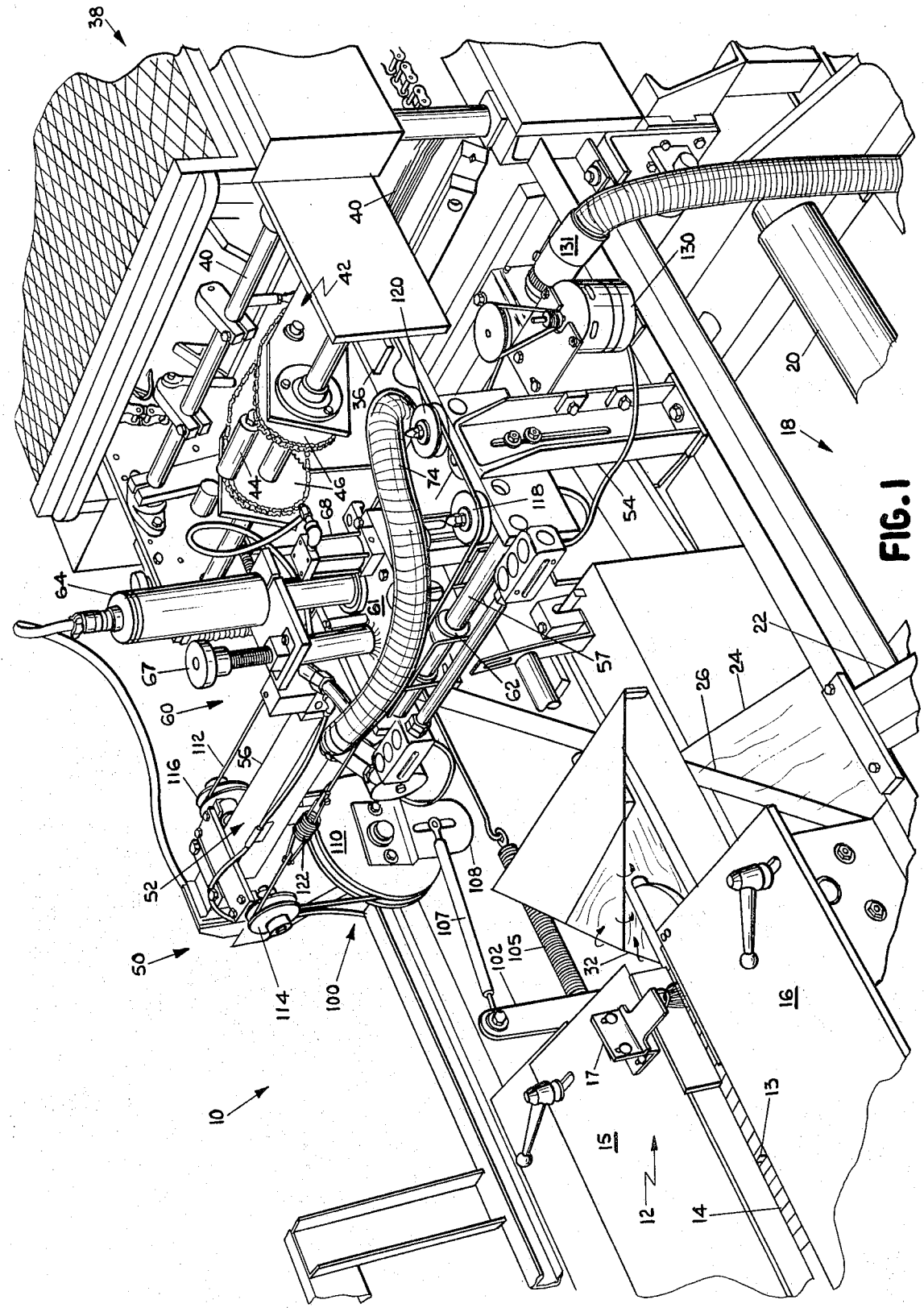
FIG. 1 is a fragmentary, perspective view of one embodiment of the packaging apparatus including a single profiling sealing means.

Referring now to the drawings in greater detail, FIG. 1 shows one embodiment of the packaging apparatus 10 including a single profiling sealing means 50 of the present invention. Generally, packaging apparatus 10 is adapted for use with a single profiling sealing means and comprises an article infeed means 12 including an infeed conveyor 14 and adjustable guide plates 15 and 16, a film or web supply means 18 including a roller 20 for receiving and dispensing a continuous supply of heat shrinkable web or film 24 and a web or film hold down strap 22 mounted over roll 20 in order to facilitate the controlled release of the web or film 24 from roll 20. The packaging apparatus further includes a guide bar 26 for guiding the approach of film 24 to the film folder means 28. Web or film 24 may be any thermoplastic or fusable film such as those described in U. S. Pat. Nos. 3,333,397 and 3,518,808.

Film folder means 28 is conventional and well known in the field and functions to form a continuous folded film package from a single roll or web of film. It includes a top plate 30, an angularly oriented side wall 32, and a bottom plate 34. Thus, in the embodiment shown as the web or film 24 is received from film supply 18 over guide bar 26, it passes under film folder means 28 and around and over the various portions of folder means 28 (as shown by the arrows in FIG. 1) to produce a folded film package for receiving the individual articles such as contoured bottles 36. The film is thus folded in a so-called centerfolded fashion and is pulled from the film supply 18 through the film folder means 28 by means of a sealing bar apparatus 38.

Sealing bar apparatus 38 is of the type which is more fully described in U. S. Pat. No. 3,518,808 and includes a plurality of heated seal bars 40 for pinching or compressing the centerfolded film or web 24 between the individually spaced articles 36 above and below the web. Thus, as the web is grasped between the articles 36, by seal bars 40, the seal bars are heated by an electrical resistance means in order to cut and seal the individual article packages and also to provide motive power for pulling the web through the apparatus and beneath the profiling sealing means 50 comprising the present invention. Sealing bar apparatus 38 further includes a product positioning means 42 including a plurality of article package contacting rolls 44 rotatably mounted on chain driven sprockets 46 for contacting the individually spaced articles 36 and adjusting their relative positions as they enter sealing bar apparatus 38.

The general operation of the packaging apparatus 10 will now be apparent. Articles or product containers 36 are fed by an infeed conveyor 14 under a brush 17 which slightly retards the forward motion of the articles on conveyor 14 and assures that the articles are in position against infeed pushers 13 (FIG. 1) and are properly timed upon entering folded film 24. Film 24 is pulled from film supply means 18 under, around and through a film folding means 28 by means of sealing bar apparatus 38 such that a centerfolded film package for receiving articles 36 is formed. After insertion of the articles 36 within the folded film package, the sealing bar apparatus 38 pulls the individually spaced articles through the profiling sealing means 50 where the centerfolded film including the individually spaced articles 36 is cut and sealed along the contour of each article, as will be discussed more fully below. After passing through the profiling sealing means 50, the individually packaged articles are cut and sealed therebetween by means of sealing bar apparatus 38. After this they may be removed and passed through a heat shrink tunnel or the equivalent which completes the packaging operation by shrinking the heat shrinkable film tightly around each contoured article 36.

Having described the environment for one type of packaging apparatus with which the seal for the present invention may be used, the unique profiling sealing means 50 will now be more fully described. Referring again to FIG. 1, the profiling sealing means 50 generally comprises a support means or framework 52 supporting a reciprocating sealing head or sealing means 60 which is reciprocated at a predetermined rate by means of an adjustable camming means 100. The sealing means 60 is reciprocated at a predetermined rate as set on the camming means 100 such that an ultra-sonic sealing unit 64 can cut and seal the heat shrinkable film package enclosing the individually spaced articles 36 passing thereunder, along the contours of the individual articles. The camming means 100 and sealing means 60 are driven by a motive power means 80 including a phase variation means 90 for adjusting the timed feeding of the articles 36 on infeed conveyor 14 into the film or web 24.

Figure 2:
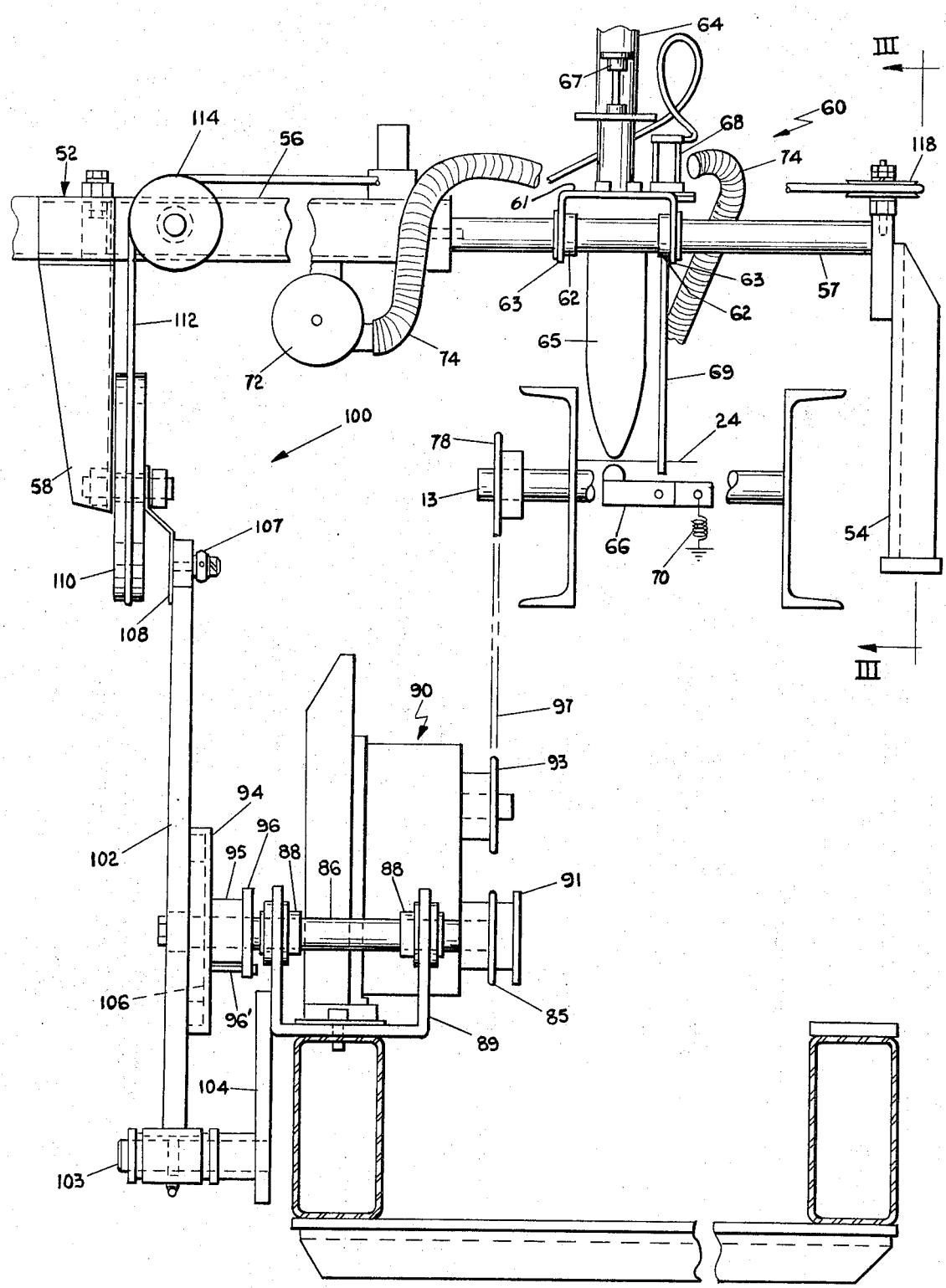
FIG. 2 is a fragmentary, end elevation of the packaging apparatus shown in FIG. 1 including the single profiling sealing means and the camming means operably associated therewith.

Referring now to FIGS. 2 through 7, the construction and operation of the single profiling sealing means 50 will become more apparent. As shown in FIG. 2, support means or framework 52 comprises a bridge asembly including upright frame members 54 and a cross member 56. Mounted between cross member 56 and one of the upright frame members 54 are two slide rods 57 on which the sealing means or sealing head 60 is slidably mounted. The framework 52 also includes a downwardly extending frame member 58 having extensions 58, which member and extensions 58 and 59 support a portion of the camming means 100.

The film sealing and severing means or sealing head 60 (FIG. 2) includes a base means or plate 61 which is slidably mounted on slide rods 57 by means of bearings 62. Bearings 62 are mounted in axially aligned apertures formed in flanges 63 of base plate 61. Supported on base plate 61 is the ultra-sonic sealing unit 64 including sealing tip 65. Ultra-sonic sealing unit 64 is one of several commercially available types of ultra-sonic sealers. Ultra-sonic sealing unit 64 is vertically adjustable with respect to a cooperating, pivotally mounted, sealing anvil 66 by means of a threaded adjustment rod and handle 67. When the packaging apparatus 10 is operating, the web or film package 24 is adapted to be pulled between the sealing tip 65 and sealing anvil 66. Thus, cutting and sealing contact can be made with the film as the sealing head 60 is reciprocated on rods 57 in a predetermined path to follow the contour of the individually spaced and packaged articles 36. Base plate 61 also includes and supports a vertically mounted pneumatic cylinder 68 which drives a rod 69.

When the packaging apparatus 10 is not in use, and the film 24 is not in place between the tip 65 and anvil 66, the air cylinder 68 and rod 69 are activated to pivot the anvil 66 away from sealing tip 65, thereby preventing damage to the sealing unit. The anvil 66 is normally biased into contact with the sealing tip 65 by means of spring means 70.

Also mounted on base plate 61 are two cable clamps 71 for securely clamping a drive cable mounted on a plurality of pulleys such that the base plate, and components supported thereon, are reciprocated along the length of rods 57 simultaneously with the clamped portion of the cable. Further, a blower 72 and flexible cooling tube 74 are mounted adjacent sealing head 60 to direct a flow of cooling air on sealing tip 65.

Figure 3:
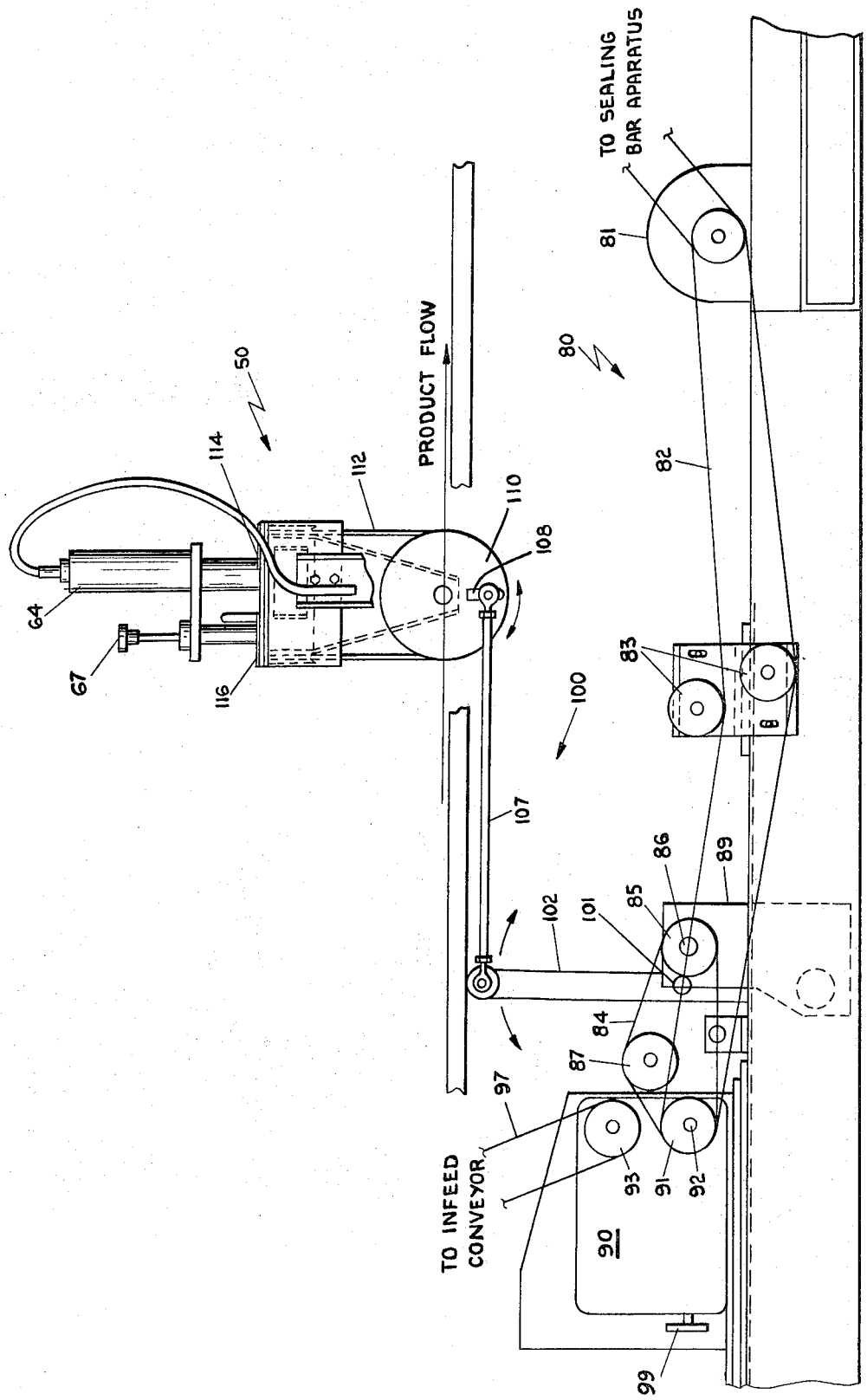
FIG. 3 is a fragmentary, side elevation of the apparatus shown in FIG. 2 taken along line III of FIG. 2.

Referring now to FIGS. 2 through 4, the shift control means or camming means 100 for reciprocally driving the sealing means 60 will be more fully described. As stated above, a motive power means 80 drives camming means 100 through a phase variation means 90. The motive power means 80 includes an electric motor 81 which drives a chain 82 and a sprocket 91 on the phase variation means or phase variator 90. The tension on chain 82 is adjustable with adjustable take-up sprockets 83. Sprocket 91 is mounted co-axially and horizontally spaced from a second sprocket (not shown) on shaft 92. The second sprocket on shaft 92 drives sprocket 85 mounted on shaft 86 by means of a chain 84. An adjustable take-up sprocket 87 is provided to adjust the tension on chain 84. The sprocket 85 drives shaft 86 which is supported by bearings 88 mounted in a U-shaped frame member 89. Mounted on the opposite end of shaft 86 from sprocket 85 is a removable contoured cam 94 which is affixed to shaft 86 by means of a keyed spacer 95, a retaining plate 96, and securing means or bolts 96'. The rotation of drive sprocket 91 also drives a sprocket 93 on phase variator 90 by means of an internal gearing system (not shown). The sprocket 93, in turn, drives a chain 97 which drives a sprocket 98 mounted on drive shaft 13 of infeed conveyor 14. The phase variator 90 functions as a differential, and may be adjusted by means of a handle 99 to vary the timing of the infeed of articles 36 from infeed conveyor 14 into centerfolded film package 24 within film folder means 28. Such phase variation means, including the means for adjusting the timing thereof, are conventionally known. Thus, the single power means or electric motor 81 drives both the sealing head 60 in a reciprocating movement transverse to the flow of the film package 24 and the infeed conveyor 14. Use of the phase variation means or phase variator 90 also allows the adjustment of the timing or spacing of the articles 36 within film package 24 in relation to the cutting and sealing operation performed by both the profiling sealing means 50 and the sealing bar apparatus 38. The sealing bar apparatus 38 may also be driven from the single electric motor 81 as shown in FIG. 3, in order to completely synchronize the operations of the packaging apparatus 10.

As described above, contoured cam 94 is mounted on shaft 86 and comprises a portion of the adjustable camming means 100. Retaining plate 96 and bolts 96' allow the position of cam 94 to be adjusted with respect to the rotational position of shaft 86 by the clamping of keyed spacer 95 therebetween. Thus, the position of cam 94 with respect to shaft 86 may be set and maintained even when the entire cam-spacer-retaining plate unit is removed from shaft 86 in order to allow the use of another cam 94 having a different contour.

The rotation of cam 94 cams a stud 101 affixed to pivot arm 102 which is pivotally mounted on shaft 103 which extends at right angles from a frame member 104 affixed to frame member 89. Cam 94 may be either of the external or internal camming type as shown in FIGS. 6 and 7. Thus, in FIG. 6, 94 is the external cam type in which the stud 101 is cammed by the external surface of cam 94 and held in constant contact therewith by the biasing action of spring 105. The external type cam 94 is the type used in the embodiment shown in FIG. 1 where pivot arm 102 is biased by spring 105. As shown in FIG. 7, a cam 94' may also be used and is of the internal type in which case the pivot arm 102 requires no external biasing since stud 101 is retained within contoured slot 106 during the rotation of cam 94'. Thus, depending on the size and type of cam required, either the external or internal type cam may be chosen.

Referring again to FIGS. 2, 3 and 4, pivot arm 102 is operably connected with a drive pulley 110 by means of an adjustable connecting arm 107. The connecting arm is pivotally mounted at the end of pivot arm 102 and within a slot 108 on pulley 110. The position of the pivotal connection in slot 108 is adjustable to vary the amount of arc through which the pulley 110 is driven for each oscillation of pivot arm 102. Additionally, the length of connecting arm 107 is adjustable to further vary the length of the arc through which the pulley 110 is driven. As will be described below, the length of the arc through which pulley 110 is driven governs the speed at which head 60 is reciprocated. A longer arm 107 causes head 60 to travel farther in a given length of time, thereby increasing the magnitude or size of path cut and sealed, which path is simultaneously defined by the contour of cam 94 or 94'.

Drive pulley 110 is adapted to engage a cable 112 which is arranged to be clamped by clamps 71 in order to reciprocate sealing head or means 60 as described above. Cable 112 is fitted about drive pulley 110 and extends vertically therefrom up and about two guide pulleys 114 and 116 which direct the cable in a horizontal direction parallel to cross member 56 to sealing means 60 and beyond to guide pulleys 118 and 120. Pulleys 110, 114, 116, 118 and 120 are all rotationally mounted on suitable bearings and shafts as depicted in the figures. Additionally, cable 112 includes a spring take-up 122 for constant adjustment of the tension on cable 112. Cable 112 thus forms a closed path and is reciprocally driven by drive pulley 110 which is, in turn, driven by pivot arm 102 through connecting arm 107. The attachment of cable 112 to sealing means 60 through clamps 71 therefore causes sealing means 60 to reciprocate in unison with the movement of cable 112.

The cable 112 may be one of several commercially available types having a twisted wire core covered by a plastic or rubberized covering to reduce noise and wear.

Referring now to FIG. 5, the operation of the sealing tip 65 in combination with the flow of the centerfolded package 24 containing the spaced contoured articles 36 will become apparent. As the web or film 24 is pulled along the direction of flow by sealing bar apparatus 38, the ultra-sonic sealing tip 65 is reciprocated transverse to the direction of flow of film 24 at a predetermined rate as determined by the contour of the external surface of cam 94 or the internal slot 106 of cam 94'. The contour of the cam or slot may be designed to accommodate any contour encountered on articles 36. Thus, as shown in FIG. 5, where the sealing tip is cutting and sealing along the contour of articles 36, the sealing tip 65 must be reciprocated along the bottom of each article 36, shown at 124, and the speed then quickly reduced and the reciprocation reversed to form the curved area 125, with the reciprocation speed held at a constant rate to form the slanted portion of the seal 126. The cam or slot must then cause no movement of the pivot arm, cable, and sealing means in order to allow the sealing tip 65 to cut and seal along the straight line at the edge of article 36 shown at 127. Once the sealing tip has reached the end of portion 127, the cycle must be repeated such that the tip cuts along the bottom portion of the next article 36 shown at 124, etc. As the film 24 is cut and sealed along the contoured path, the scrap portion 25 is fed through rollers 128 and 129 powered by an electric motor 130 to a vacuum means 131 (see FIGS. 1 and 5) which removed the scrap from the sealing area of packaging apparatus 10. The film package 24 is kept in constant contact with the sealing tip 65 by the biased anvil 66. The combined motion of the flow of film 24, as pulled by sealing bar apparatus 38, and the reciprocation of sealing tip 65 thus causes the film package to be cut and sealed along the contoured path described above. The cutting and sealing action leaves a margin of heat shrinkable film surrounding each contoured article 36, as shown in FIG. 5, which margin will be shrunk to a tight fit about the article when the articles are subsequently passed through a heat shrink tunnel. The individual articles are separated into individual packages in the final steps performed by packaging apparatus 10 as they pass through sealing bar apparatus 38. Sealing bar apparatus 38 cuts and seals between the spaced articles 36 along a line such as that shown at 132 in FIG. 5. The size of the margin left around each contoured article 36 may be adjusted relative to the parameters of the heat shrinkable film 24. Since film 24 may be obtained commercially in various types which will controllably shrink at elevated temperatures up to 50 percent in both length and width, the amount of shrinkage which the film will undergo in the heat shrink tunnel will determine the size of the margin which must be left around each article. Consequently, both the shape of the article to be packaged and the type of heat shrinkable film to be used for the packaging are taken into consideration when the amount of travel and the speed of the sealing head 60, and thus the shape or contour of cams 94 or 94'.

DOUBLE PROFILING SEALING MEANS EMBODIMENT

Referring now to FIGS. 8–10, another embodiment 140 of the packaging apparatus including a double profiling sealing means 160 will be described. Packaging apparatus 140, with double profiling sealing means 160, comprises an article infeed means 142, a bottom film or web supply means 144, an upper or top film or web supply means 148, and a sealing bar apparatus 152. As shown in FIG. 8, articles 154 to be packaged are placed on infeed apparatus 142 at regular intervals on the bottom film or web 145. Film may be drawn from either roll 146 or 147, with the remaining roll being held in reserve for periods when the supply of film has been exhausted from the other roll. The articles 154 placed atop bottom film 145 are carried thereby through the remainder of apparatus 140. At the end of infeed apparatus 142, a top or upper film or web 149 is unrolled from alternative film supply rolls 150 or 151 and guided into place over articles 154. The articles 154 are thus sandwiched between lower and upper film webs 145 and 149. The packaging apparatus 140 therefore includes no film folder means such as that shown at 28 and associated with the first embodiment 10 of the packaging apparatus described above.

After the upper layer of film 149 is placed over spaced articles 154, this film package, with the articles inserted between the film layers thereof, passes through the double profiling sealing means 160 for cutting and sealing along the ends of each article, as will be more fully described below. Thereafter, as described above, for packaging apparatus 10, the sealing bar apparatus 152 seals each individual article along the side edges thereof, thereby transversely separating the web and the articles into individual packages while providing the motive power for drawing the upper and lower films 145 and 149 through the entire apparatus.

Referring now to FIG. 9, the double profiling sealing means 160 will be described in greater detail. As depicted therein, this double profiling sealing means 160 generally comprises a support means or framework 162 supporting two reciprocating sealing heads or sealing means 170 and 190 which are moved transversely of the web at a predetermined rate by means of an adjustable control means (not shown) similar to camming means 100. The rate at which sealing means 170 and 190 are moved at each stage of movement thereof is predetermined and controlled as by the camming means such that ultrasonic sealing units 172 and 192 can cut and seal the heat shrinkable film package enclosing the individually spaced articles 154 passing thereunder in controlled contour paths along both unsealed edges of the film package. As described above in connection with the first packaging apparatus 10, the camming means and sealing means 170 and 190 are driven by a motive power means such as an electric motor. By varying the rate of movement of the profiling means, while the webs move past, the particular desired contour pattern is created to correlate in optimum fashion with the article configuration.

Framework 162 is similar to framework 52 described above except that it is constructed to support two sealing means 170 and 190 as opposed to a single sealing means 160. As shown in FIG. 9, framework 162 comprises a bridge assembly including upright frame members 164 and a cross member 166. Mounted between cross member 166 and one of the upright frame members 164 are two slide rods 167 on which the sealing means or sealing heads 170 and 190 are slidably mounted. As in the embodiment 52 referred to above, the framework 162 also includes a downwardly extending frame member 168 having extensions 169, which member and extensions 168 and 169 support the pulley and cable means forming a part of the camming means.

The sealing heads 170 and 190 each include a base means or plate 174 and 194, respectively, slidably mounted on slide rods 167 by means of bearings 176 and 196. Supported on base plates 174 and 194 are the ultrasonic sealing units 172 and 192 including sealing tips 173 and 193. Ultrasonic sealing units 172 and 192 are vertically adjustably mounted with respect to cooperating, pivotally mounted, sealing anvils 178 and 198 by means of threaded adjustment rods and handles 177 and 197.

The sealing units are located close to the interior edges 175 and 195 of base means 174 and 194 respectively in order to enable sealing means 160 to more completely profile the entirety of the articles 154 when the units 170 and 190 approach each other at the ends of the articles. Also included are pneumatic cylinders 180 and 200 (FIG. 10) which vertically shift rods 182 and 202. When no film or web is between the sealing tips 173 and 193 and anvils 178 and 198 respectively, rods 182 and 202 are extended downwardly by cylinders 180 and 200 to hold anvils 178 and 198 down and prevent the contact of the respective anvils with the respective sealing tips. Springs 184 and 204 are included to bias the anvils upwardly toward their respective tips. An interlock mechanism (not shown) prevents movement of the film until the anvil and sealing tip are in contact with the film.

Further as shown in FIG. 9, the sealing heads 170 and 190 are respectively reciprocated by opposite parts of the pulley and cable means such that they reciprocate controllably towards and away from one another, forming mirror image contours around the article and along the longitudinal edges of the moving film package. The sealing means 160 is thus especially useful for profiling symmetrical articles. The pulley and cable means includes drive pulley 208, guide pulleys 210, 212, 214 and 216, and a cable 218 for driving the respective sealing heads 170 and 190. Additionally, blowers 220 and 222 are mounted on the framework 162 to drive streams of air through tubes 224 and 226 to cool the respective sealing tips 173 and 193.

It will thus be understood that in the embodiment 140 of the packaging apparatus shown in FIGS. 8–10, the pulley and cable means will be driven by a camming means and in turn drives sealing units 170 and 190 toward and away from one another along rods 167. Thereby, mirror image contours are formed along each longitudinal edge of the film package passing beneath the double profiling sealing means.

A camming means similar to camming means 100 described above may be used to govern the predetermined reciprocation rates of the respective sealing units. The mirror image contours result from the fact that each respective sealing unit is clamped to portions of cable 218 (FIG. 9) that move in opposite directions. Thus, sealing unit 190 is clamped by clamps 206 to one portion of the cable, and sealing unit 170 is clamped by clamps 186 to the oppositely moving portion of cable 218. When drive pulley 208 is rotated in a clockwise direction, i.e., toward the bottom of FIG. 9, the lower portion of cable 218 will move to the right, and the upper portion will move to the left. Simultaneously, sealing means 190 will move with the lower part of cable 218 to the right, and sealing means 170 will move to the left. The sealing means 190 and 170 will thus move away from each other at the same rate. Similarly, when the drive pulley is rotated in a counterclockwise direction, i.e., toward the top of FIG. 9, the lower portion of cable 218 will move to the left and the upper portion will move to the right. Thus, the sealing means 170 and 190 will move towards one another at the same rate. As will be apparent to one skilled in the art, this double profiling sealing means 160 is especially useful for profile cutting and sealing along the edges of a symmetrical article wherein each edge of the article is generally a mirror image of the opposite edge of the article, although it may be used to profile other types of articles. Only one camming means or other shifting control means is required to operate both sealing means 190 and 170.

Other embodiments of the invention will be apparent from these guidelines. Thus, two separate frameworks such as framework 52 or 162 may be mounted along the product flow path on a packaging apparatus in order to cut and seal both edges of an asymmetrical article to be packaged. The first framework and sealing means supported thereby will be reciprocated by a camming means predetermined to follow the contour of one side of a symmetrical article. The next framework and sealing means supported thereby may be reciprocated by another camming means predetermined to reciprocate the sealing means along the opposite sides of the symmetrical article to be packaged.

Further, the profiler may be programmed to follow differing complex contours along the relatively moving web. The shift control may be mechanically, hydraulically, pneumatically or electrically (e.g. electromagnetically) activated and/or regulated as desired or necessary.

OPERATION

In the operation of the packaging apparatus 10 and the various elements and components thereof, the heat shrinkable web or film 24 is withdrawn from roller 20 of film supply means 18 in a controlled manner while being held down by holddown strap 22. The web in its unfolded sheet orientation is drawn over guide bar 26 under film folder means 28 over and around top and bottom plates 30 and 34 and angularly oriented side wall 32. The film 24 is drawn through folder means 28 by means of sealing bar apparatus 38. The folder means forms the web 24 into a centerfolded film package having a fold along one edge with the opposite edge being opened. Individual contoured articles 36 are fed into the centerfolded film package at spaced intervals from infeed conveyor 14 as guided by adjustable guide plates 15 and 16 after being moved back against infeed pushers 13 by brush 17. After insertion into the folded film, the individual articles within the folded film package are drawn under profiling sealing means 50 which is reciprocated at a predetermined rate to cut and seal the open edge of film package 24 uniquely along the contour of each article 36.

The profiling sealing means 50 includes a sealing head or means 60 having an ultra-sonic sealing unit 64 mounted perpendicularly therewith. An electrical motor 81 drives cam 94 by means of a chain and sprocket arrangement through a phase variation means 90 for adjusting the timed relationship of the phase contoured articles 36 to the reciprocation of sealing head 60. The cam 94 is contoured to pivot arm 102 by means of stud 101 at a predetermined rate according to the contour of the articles 36. Pivot arm 102 in turn reciprocates connecting arm 107 which oscillates drive pulley 110 and cable 112. Arm 107 may be adjusted lengthwise to vary the length of the arcuate rate of travel of drive pulley 110, thereby defining the magnitude, or size of the particular shape or contour defined on cam 94 or 94'. Cable 112 is mounted on a plurality of guide rollers and affixed to one edge of sealing head 60 by clamp 71 so as to move sealing head 60 in unison therewith.

The ultra-sonic sealing unit 64 includes a sealing tip 65 mounted below sealing head 60 which tip 65 cooperates with a pivoted anvil 66 to compress, cut, and seal the film package 24 therebetween. As mentioned above, the combination of the direction of flow of film package 24 and the reciprocation of sealing tip 65 at the predetermined rate, as determined by cam 94 or 94' and the length of connecting arm 107, causes the sealing tip to cut and seal along the contour of each individual spaced article 36. The scrap section cut from film package 24 is removed by rollers 128 and 129 and electric motor 130 and vacuum means 131. After passing beneath the profiling sealing means 50, the web or film package, which is sealed along one edge and folded along the other, enters sealing bar apparatus 38. There the cooperating bars 40 grip the film between the articles 36 to cut and seal the film between the individual articles, thereby forming individual packages which are completely sealed about the contour of the enclosed article.

A blower 72 and tube 74 are included to cool the sealing tip 65 as it continuously seals the web or film 24. Further, pneumatic cylinder 68 and rod 69 are mounted on sealing head 60 so as to pivot the anvil 66 out of contact with tip 65 when the packaging apparatus 10 is not in use. The cams 94 may be changed to accommodate the contours of various articles 36, and the position of connecting arm 107 in slot 108 and the length of connecting arm 107 may be changed to vary the speed of sealing head 60 and thus the magnitude of the contoured path followed by sealing tip 65.

The operation of packaging apparatus 140 is similar to the operation of packaging apparatus 10 with the exception of the film folding means 28 and the reciprocation of both sealing means 170 and 190. In packaging apparatus 140, the heat shrinkable bottom web or film is withdrawn in a controlled manner from either supply roll 146 or 147 along infeed apparatus 142. The individual articles to be packaged 154 are placed thereon at regular intervals along film 145 and are supported and transported thereby. An upper or top film or web 149 is guided over the continuous line of articles 154 from either roll 150 or 151 thereby forming a film sandwich. This film sandwich then passes beneath the double profiling sealing means 160 where the opposite longitudinal edges of the film are cut and sealed in profiled contours. The film package is then cut transversely by sealing bars 152 into individual packages in preparation for the shrinking of the film in a heat shrink tunnel.

Using either the single or double profiling apparatus just described, the article, with its profiled package is then passed through the heat shrink tunnel. It will be realized that the profiled package, prior to shrinkage, will be substantially larger in size than the article enclosed. In other words, the film will project about one-half inch or so beyond the edge of the article. By virtue of the profiling, however, this projection will be generally uniform around the article periphery. Thus, when the film is shrunk, it contracts neatly into conformity with the article shape, creating a neat, attractive package.

Certain modifications to suit particular articles, rate of operation, and/or type of packaging may be made within the concept presented, which is intended to be limited only by the following claims and the reasonable equivalents thereto.

The present novel invention will thus be seen to constitute an improved packaging apparatus and method to wrap contoured articles with a heat shrinkable film and cut and seal the film along the contour of each of the individual articles. It will also be seen that the apparatus and method can accommodate articles having various contours and variously sized articles having each type of contour.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. An improved packaging apparatus for packaging articles by covering and sealing said articles with a heat shrinkable film prior to shrinking said film about said articles in a heat shrink tunnel, said apparatus including an article infeed means, film supply means, and drive means for advancing said film in a continuous flow of film through said apparatus and for cutting and sealing said film between said articles, the improvement comprising a profiling sealing means controllably movable for sealing said film along at least one portion of the contour of said articles, said profiling sealing means including at least one adjustable, reciprocally mounted sealing means for cutting and sealing said moving film along the contours of said articles, and control means for reciprocally moving said sealing means at a predetermined rate including means for defining said rate separate from the article to be packaged.

2. An improved packaging apparatus in accordance with claim 1 wherein said profiling sealing means further includes an adjustable timing means for adjusting the timed relationship of said article infeed means to the operations of the remainder of said apparatus.

3. An improved packaging apparatus in accordance with claim 2 wherein said adjustable timing means comprises a phase variation means which is adjustable to vary the positions of said articles in said article infeed means with respect to the position of said profiling sealing means.

4. An improved packaging apparatus in accordance with claim 1 wherein said profiling sealing means includes two reciprocally mounted sealing means, said film including two longitudinal unsealed edges, both of said sealing means being reciprocated by said control means such that said film is profile cut and sealed along both unsealed edges thereof.

5. An improved packaging apparatus for packaging articles by covering and sealing said articles with a heat shrinkable film prior to shrinking said film about said articles in a heat shrink tunnel, said apparatus including an article infeed means, film supply means, and drive means for advancing said film in a continuous flow of film through said apparatus and for cutting and sealing said film between said articles, the improvement comprising a profiling sealing means controllably movable for sealing said film along at least one portion of the contour of said articles, said profiling sealing means including at least one adjustable reciprocally mounted sealing means for cutting and sealing said moving film along the contours of said articles, and control means for reciprocally moving said sealing means; said profiling sealing means also including another reciprocally mounted sealing means, said film including two longitudinal unsealed edges, both of said sealing means being reciprocated by said control means such that said film is profile cut and sealed along both unsealed edges thereof; said two sealing means being both slidably supported on one support means and being reciprocated simultaneously along the contour of said article along both longitudinal edges of said film, said sealing means being reciprocated toward and away from one another at the same rate as determined by said control means.

6. An improved packaging apparatus for packaging articles by covering and sealing said articles with a heat shrinkable film prior to shrinking said film about said articles in a heat shrink tunnel, said apparatus including an article infeed means, film supply means, and drive means for advancing said film in a continuous flow of film through said apparatus and for cutting and sealing said film between said articles, the improvement comprising a profiling sealing means controllably movable for sealing said film along at least one portion of the contour of said articles, said profiling sealing means including at least one adjustable reciprocally mounted sealing means for cutting and sealing said moving film along the contours of said articles, and control means for reciprocally moving said sealing means; said profiling sealing means also including another reciprocally mounted sealing means, said film including two longitudinal unsealed edges, both of said sealing means being reciprocated by said control means such that said film is profile cut and sealed along both unsealed edges thereof; said control means comprising two cammed pivot means each including a removable contoured cam positively engaged to a pulley and cable means and driven by a motive power means.

7. An improved packaging apparatus for packaging articles by covering and sealing said articles with a heat shrinkable film prior to shrinking said film about said articles in a heat shrink tunnel, said apparatus including an article infeed means, film supply means, and drive means for advancing said film in a continuous flow of film through said apparatus and for cutting and sealing said film between said articles, the improvement comprising a profiling sealing means controllably movable for sealing said film along at least one portion of the contour of said articles, said profiling sealing means including at least one adjustable reciprocally mounted sealing means for cutting and sealing said moving film along the contours of said articles, and control means for reciprocally moving said sealing means; said adjustable reciprocally mounted sealing means comprising an ultra-sonic sealing means vertically adjustably mounted on a base means, said base means being slidably mounted over said flow of film such that said control means reciprocates said base means transverse to said flow of film.

8. Apparatus for encompassing contoured articles with profiled packaging film to be heat shrunk, comprising:

means for advancing shrink film in a path;

means for positioning contoured articles at intervals between layers of the shrink film being advanced;

film sealing and severing means positioned adjacent said path and being shiftable generally transversely of said path; and shift control means operably associated with said shiftable film sealing and severing means to regulate shifting thereof at a predetermined rate in synchronism with the film to follow the profile of the articles, said shift control means including means separate from the contoured article to be packaged for defining said predetermined rate.

9. Apparatus in accordance with claim 8 wherein said film sealing and severing means comprises at least one adjustable reciprocally mounted sealing means.

10. Apparatus in accordance with claim 9 wherein two adjustable sealing means are reciprocally mounted such that each is shifted by said shift control means and severs and seals said shrink film along a different portion of the contour of each of said articles.

11. Apparatus for encompassing contoured articles with profiled packaging film to be heat shrunk, comprising:

means for advancing shrink film in a path;

means for positioning contoured articles at intervals between layers of the shrink film being advanced;

film sealing and severing means positioned adjacent said path and being shiftable generally transversely of said path; and shift control means operably associated with said shiftable film sealing and severing means to regulate shifting thereof in synchronism with the film to follow the profile of the articles; said film sealing and severing means comprising two adjustable sealing means, said sealing means being reciprocally mounted such that each is shifted by said shift control means and severs and seals said shrink film along a different portion of the contour of each of said articles; said shift control means comprising an adjustable camming means, said sealing means being slidably mounted on support means, said camming means reciprocating said sealing means toward and away from one another simultaneously along mirror image contours.

12. Apparatus in accordance with claim 8 wherein said shift control means comprises an adjustable camming means for shifting said film sealing and severing means.

13. Apparatus for encompassing contoured articles with profiled packaging film to be heat shrunk, comprising:

means for advancing shrink film in a path;

means for positioning contoured articles at intervals between layers of the shrink film being advanced;

film sealing and severing means positioned adjacent said path and being shiftable generally transversely of said path; and shift control means operably associated with said shiftable film sealing and severing means to regulate shifting thereof in synchronism with the film to follow the profile of the articles; said shift control means comprising adjustable camming means for shifting said film sealing and severing means; said adjustable camming means comprising a cammed pivot means including a removable contoured cam positively engaged with a pulley and cable means and driven by a motive power means, said pulley and cable means arranged in positive engagement with said film sealing and severing means such that when said cammed pivot means is driven, said film sealing and severing means reciprocates across said film path by means of said pulley and cable means at a predetermined rate dependent on the contour of said removable cam, said predetermined reciprocation of said film sealing and severing means in combination with the advancement of said film causing said film severing and sealing means to sever and seal said film along the contour of said articles.

14. Apparatus in accordance with claim 8 wherein said apparatus includes an adjustable timing means for adjusting the timed relationship of said means for positioning contoured articles to the operations of the remainder of said apparatus.

15. Apparatus in accordance with claim 14 wherein said adjustable timing means comprises a phase variation means which is adjustable to vary the positions of said contoured articles in said means for positioning said contoured articles with respect to the position of said film severing and sealing means.

* * * * *